United States Patent [19]
Chappel et al.

[11] Patent Number: 6,081,527
[45] Date of Patent: Jun. 27, 2000

[54] ASYNCHRONOUS TRANSFER SCHEME USING MULTIPLE CHANNELS

[75] Inventors: John F. Chappel, Mississauga; Michael J. Tresidder, Scarborough, both of Canada

[73] Assignee: LSI Logic Corporation, Milpitas, Calif.

[21] Appl. No.: 08/961,206

[22] Filed: Oct. 30, 1997

[51] Int. Cl.[7] .......................... H04L 12/40; H04L 12/28; H04L 12/56; H04J 3/02

[52] U.S. Cl. .......................... 370/394; 370/438; 370/462; 375/220

[58] Field of Search .................................. 370/224, 349, 370/389, 392, 394, 395, 410, 413, 428, 468, 522, 438, 462; 375/220, 288, 325, 349, 354, 357, 377

[56] References Cited

U.S. PATENT DOCUMENTS

| | | | |
|---|---|---|---|
| 4,488,226 | 12/1984 | Wagner, Jr. et al. | 364/200 |
| 5,594,734 | 1/1997 | Worsley et al. | 370/395 |
| 5,602,878 | 2/1997 | Cross | 375/354 |
| 5,691,713 | 11/1997 | Ishida | 340/870.01 |

*Primary Examiner*—Alpus H. Hsu
*Assistant Examiner*—Duc Ho
*Attorney, Agent, or Firm*—Riches McKenzie & Herbert

[57] ABSTRACT

A data transfer device for transferring packets of data across an asynchronous boundary separating a first time domain from a second time domain, and, a method for transferring the packets of data is disclosed. The device comprises a plurality of transmitter/receiver combinations, which form a plurality of channels across the asynchronous boundary, such that multiple packets of data can be transferred across the asynchronous boundary at any one time. The device comprises ordering units which preserve the order of the packets of data as they are transferred across the asynchronous boundary. The ordering units perform this function by transmitting the packets of data through transmitters in a predetermined transmitter sequence and receiving the packets of data on the receivers in a predetermined receiver sequence which corresponds to the predetermined transmitter sequence. In this way, the predetermined order of the packets of data being transferred across the asynchronous boundary is preserved. In one embodiment, the channels are single handshake channels such that one handshake signal both requests receipt of a new packet of data and acknowledges receipt of a previous packet of data from the other time domain.

19 Claims, 11 Drawing Sheets

| STEP | SIDE A | | | | SIDE B | | | |
|---|---|---|---|---|---|---|---|---|
| | $DATA_{AB}$ | $REQ_{AB}$ | $ACK_{BA}$ | | $DATA_{AB}$ | $REQ_{AB}$ | $ACK_{BA}$ | |
| 1 | X | 0 | 0 | | X | 0 | 0 | |
| 2 | A | 0 | 0 | | X | 0 | 0 | |
| 3 | A | 1 | 0 | | X | 0 | 0 | |
| 4 | A | 1 | 0 | | A | 1 | 0 | |
| 5 | A | 1 | 0 | | A | 1 | 1 | |
| 6 | A | 1 | 1 | | A | 1 | 1 | |
| 7 | A | 0 | 1 | | A | 1 | 1 | |
| 8 | A | 0 | 1 | | A | 0 | 1 | |
| 9 | A | 0 | 0 | | A | 0 | 0 | |
| 10 | A | 0 | 0 | | A | 0 | 0 | |
| 11 | B | 0 | 0 | | A | 0 | 0 | |

FIG.1B (Prior Art)

| STEP | Side A COUNT | DATA$_0$ | REQ$_0$ | ACK$_0$ | DATA$_1$ | REQ$_1$ | ACK$_1$ | DATA$_2$ | REQ$_2$ | ACK$_2$ |
|---|---|---|---|---|---|---|---|---|---|---|
| | | 30 | | | 31 | | | 32 | | |
| 1 | 0 | X | 0 | 0 | Y | 0 | 0 | Z | 0 | 0 |
| 2 | 1 | A | 1 | 0 | Y | 0 | 0 | Z | 0 | 0 |
| 3 | 2 | A | 1 | 0 | B | 1 | 0 | Z | 0 | 0 |
| 4 | 0 | A | 1 | 0 | B | 1 | 0 | C | 1 | 0 |
| 5 | 0 | A | 1 | 1 | B | 1 | 0 | C | 1 | 0 |
| 6 | 0 | A | 0 | 1 | B | 1 | 1 | C | 1 | 0 |
| 7 | 0 | A | 0 | 1 | B | 0 | 1 | C | 1 | 1 |
| 8 | 0 | A | 0 | 0 | B | 0 | 1 | C | 0 | 1 |
| 9 | 0 | A | 0 | 0 | B | 0 | 0 | C | 0 | 1 |
| 10 | 1 | D | 1 | 0 | B | 0 | 0 | C | 0 | 0 |
| 11 | 2 | D | 1 | 0 | E | 1 | 0 | C | 0 | 0 |
| 12 | 0 | D | 1 | 0 | E | 1 | 0 | F | 1 | 0 |

SIDE A
FIRST TIME DOMAIN

| Side B COUNT | DATA OUT | DATA₀ | REQ₀ | ACK₀ | DATA₁ | REQ₁ | ACK₁ | DATA₂ | REQ₂ | ACK₂ |
|---|---|---|---|---|---|---|---|---|---|---|
| | | 40 | | | 41 | | | 42 | | |
| | | | | | SIDE B SECOND TIME DOMAIN | | | | | |
| 0 | Z | X | 0 | 0 | Y | 0 | 0 | Z | 0 | 0 |
| 0 | Z | X | 0 | 0 | Y | 0 | 0 | Z | 0 | 0 |
| 0 | Z | A | 1 | 0 | Y | 0 | 0 | Z | 0 | 0 |
| 1 | A | A | 1 | 1 | B | 1 | 0 | Z | 0 | 0 |
| 2 | B | A | 1 | 1 | B | 1 | 1 | C | 1 | 0 |
| 0 | C | A | 1 | 1 | B | 1 | 1 | C | 1 | 1 |
| 0 | C | A | 0 | 1 | B | 1 | 1 | C | 1 | 1 |
| 0 | C | A | 0 | 0 | B | 0 | 1 | C | 1 | 1 |
| 0 | C | A | 0 | 0 | B | 0 | 0 | C | 0 | 1 |
| 0 | C | A | 0 | 0 | B | 0 | 0 | C | 0 | 0 |
| 0 | C | D | 1 | 0 | B | 1 | 0 | C | 0 | 0 |
| 1 | D | D | 1 | 1 | E | 1 | 0 | C | 0 | 0 |

120

ASYNCHRONOUS TRANSFER SCHEME USING MULTIPLE CHANNELS

FIELD OF THE INVENTION

This invention relates to a device and method to transfer packets of data across an asynchronous boundary separating a first time domain from a second time domain. More particularly, the present invention relates to an improved data transferring device and method to substantially simultaneously transfer multiple packets of data across an asynchronous boundary.

BACKGROUND OF THE INVENTION

Several data transfer devices for transferring data across an asynchronous boundary have been used in the past. These data transfer devices allow a single packet of data to be transferred from a first time domain across an asynchronous boundary to a second time domain at any one time.

A conventional data transfer device is shown generally in FIG. 1A by reference numeral 1. The conventional data transfer device 1 comprises a first transmitter/receiver combination, shown generally by reference numeral 2, which is used to transmit a single packet of data from the second time domain, on Side B of the asynchronous boundary 6, to the first time domain, on Side A of the asynchronous boundary 6 at any one time. The conventional device 1 also comprises a second transmitter/receiver combination, shown generally by reference numeral 4, which is used to transmit a single packet of data in the opposite direction from Side A to Side B. The transmitters/receivers 2 and 4 are identical, but each operates independently of the other. Each transmitter/receiver 2 and 4 also has separate request and acknowledge handshake signals, shown in FIG. 1A by the symbols $REQ_{BA}$, $ACK_{BA}$, $REQ_{AB}$, $ACK_{BA}$, which are used to transfer a single packet of data across the asynchronous boundary 6.

FIG. 1B shows a logic table 16 illustrating the transitions of signals on Side A and Side B during a data transfer from Side A to Side B. Steps 1 to 10 of FIG. 1B illustrate the transitions required to transfer a single packet of data A across the asynchronous boundary 6 from Side A to Side B. The packet of data A is initially stored in memory unit 8A of the second transmitter/receiver 4 and a request signal $REQ_{AB}$ is sent across the asynchronous boundary 6 from flip-flop 9A to synchronizer 12B on Side B. It generally takes two clock cycles on the receiver clock, in this case clock $CLK_B$ in Time Domain B, to receive the request signal $REQ_{AB}$ from flip-flop 9A. Once Side B receives the request signal $REQ_{AB}$ from Side A, Side B captures packet of data A by using or latching packet of data A.

Once packet of data A is captured, Side B asserts an acknowledge signal $ACK_{BA}$ through flip-flop 11B which is sent across the asynchronous boundary 6 to synchronizer 10A, as shown in steps 4 to 6 of FIG. 1B. It generally takes two clock cycles of the transmitter clock, in this case the clock $CLK_A$ in the first time domain, to receive the acknowledge signal $ACK_{BA}$. The request signal $REQ_{AB}$ and the acknowledge signal $ACK_{BA}$ are then de-asserted as shown in steps 7 to 10 of FIG. 1B. A second packet of data B can then be stored in memory unit 8A of transmitter/receiver 4, as shown in step 11 of FIG. 1B, to be sent to Side B. Transmitter/receiver 2 has identical elements to transmitter/receiver 4 and if data is to be sent from Side B to Side A, transmitter/receiver 2 is used in a similar manner to transmitter/receiver 4.

It is apparent that the conventional device 1 requires several clock cycles on both clocks $CLK_A$ and $CLK_B$ to transfer a single packet of data A across the asynchronous boundary 6. Accordingly, a new packet of data cannot be sent across the asynchronous boundary 6 until the previous packet of data has been sent across the asynchronous boundary 6 and the handshake procedure has been completed. This is shown at least in FIG. 1B by the second packet of data B not being stored in the memory unit 8A until step 11, even though the second packet of data B may have arrived at the transmitter/receiver 4 much earlier. For example, if new packet of data B arrived at the transmitter/receiver 4 just after the request signal $REQ_{AB}$ for the previous packet of data A was asserted, the total latency for the new packet of data B would be equal to five signal transitions across the asynchronous boundary 6, namely $REQ_{AB}$ up, $ACK_{BA}$ up, $REQ_{AB}$ down, $ACK_{BA}$ down and $REQ_{AB}$ up again. It should also be noted that because these handshake signals do not emanate from the same side, the total latency will be limited by the slower of the two clocks $CLK_A$ and $CLK_B$.

The conventional device 1 also suffers from the disadvantage that the throughput of data across the asynchronous boundary 6 is restricted to only one channel or transmitter/receiver 4. This is particularly limiting if one side, such as Side A, has a large amount of data, such as a burst of packets of data, to send to Side B. In this case, the burst will be limited by the transmission rate of the transmitter/receiver 4. Furthermore, the performance of several elements, such as a data bus on Side A, may be impaired while data is being sent across the asynchronous boundary 6 by the transmitter/receiver 4.

Also, the conventional device 1 is less reliable and prone to metastability failures because of the number of handshake signals $REQ_{AB}$, $REQ_{AB}$, $ACK_{BA}$ and $ACK_{BA}$ required and the number of gateways required to send and receive these handshake signals. A metastability failure results when data or a signal, such as the request signals $REQ_{AB}$, $REQ_{AB}$, or the acknowledge signals $ACK_{AB}$, $ACK_{BA}$, is received at the same time as the receiving clock signal, either $CLK_A$ or $CLK_B$, is changing.

If this happens, the output from the gateway receiving the data or signal is unstable. The amount of time that the gateway is unstable is a decaying function which is a physical characteristic of the flip-flop gateway. This decreases the efficiency of the device, and, if the gateway stays unstable until the next cycle of receiving data, circuit failure could result. Therefore, there is a possibility of a metastability failure in the prior art devices each time one of the four handshake signals $REQ_{AB}$, $REQ_{BA}$, $ACK_B$ or $ACK_{BA}$ is received.

SUMMARY OF THE INVENTION

Accordingly, it is an object of this invention to at least partially overcome some of the disadvantages of the prior art. Also, it is an object of this invention to provide an improved data transfer device and method to effect transfer of data across an asynchronous boundary more efficiently and reliably by increasing throughput and decreasing latency.

Accordingly, in one of its aspects, this invention resides in a data transfer device for transferring packets of data having a predetermined order across an asynchronous boundary separating a first time domain from a second time domain, said device comprising: a plurality of transmitters located in the first time domain for transmitting packets of data across the asynchronous boundary, each transmitter transmitting one packet of data in response to a transmit signal; a plurality of receivers located in the second time domain for receiving the packets of data transmitted by the plurality of transmitters, each receiver receiving packets of data from only one transmitter of the plurality of transmitters; first ordering means located in the first time domain for sending the transmit signal to the transmitters to transmit the packets of data in the predetermined order; and second ordering means located in the second time domain for outputting the packets of data received by the receivers in the predetermined order.

In a further aspect, the present invention resides in a data transfer device for transferring packets of data having a predetermined order across an asynchronous boundary separating a first time domain from a second time domain, said device comprising: a plurality of channels, each channel for sending one packet of data across the asynchronous boundary from the first time domain to the second time domain in response to a first control signal; first ordering means located in the first time domain for sending the first control signal to the channels to transmit the packets of data in the predetermined order; and second ordering means located in the second time domain for outputting the packets of data in the predetermined order.

In a still further aspect, the present invention resides in a method for transferring packets of data having a predetermined order across an asynchronous boundary separating a first time domain from a second time domain, said method comprising the steps of: (a) transmitting a packet of data in the predetermined order across the asynchronous boundary from one transmitter of a plurality of transmitters located in the first time domain to an associated receiver of a plurality of receivers located in the second time domain, wherein each receiver is associated with one transmitter such that the receiver can receive packets of data from only the transmitter with which the receiver is associated; (b) outputting the first packet of data in the second time domain in the predetermined order; (c) transmitting a next packet of data in the predetermined order across the asynchronous boundary from one of the transmitters to the associated receiver; (d) outputting the next packets of data in the second time domain in the predetermined order; and (e) repeating steps (c) and (d) for each packet of data to be transferred to the second time domain.

Accordingly, the present invention provides an asynchronous transfer device and method to transfer packets of data across an asynchronous boundary using a plurality of transmitters and receivers. In particular, the present invention provides an asynchronous transfer device and method which can substantially simultaneously transfer multiple packets of data and handshake signals.

One advantage of the present invention is that latency between transmission of packets of data can be decreased. One way in which latency can be decreased is that the invention comprises a plurality of transmitters/receivers, which can also be referred to as channels, to transfer the packets of data across the asynchronous boundary 6, and, ordering means to maintain the order of the packets of data transferred by the plurality of transmitters/receivers. Therefore, while a first packet of data is being sent on a first transmitter/receiver combination, transmission of a second packet of data can commence on a second transmitter/receiver combination, but the order of the first and second packets of data will be maintained on the other side of the asynchronous boundary 6. In other words, the second packet of data need not wait until transmission of the first packet of data is completed, but the other side of the asynchronous boundary 6 will be able to determine the order of the packets of data.

A further advantage of the present invention is that throughput can be increased because each transmitter/receiver combination of the plurality of transmitter/receiver combinations can transmit a packet of data at the same time. In other words, multiple packets of data can be transferred across the asynchronous boundary substantially simultaneously while maintaining their order. This results in several more packets of data being transferred in the same number of clock cycles of clock $CLK_A$ and $CLK_B$ than the conventional device requires to transfer one packet of data.

A further advantage is that the plurality of transmitters/receivers can comprise single handshake transmitters/receivers. In single handshake transmitters/receivers, only one handshake signal is required to transfer each packet of data, rather than two handshake signals, as with the conventional device. This reduces by about one half the probability of a metastability failure occurring. Also, using single handshake transmitters/receivers further decreases the latency and improves the throughput of the present device.

In addition, using a single handshake transmitter/receiver requires fewer gateways and therefore less space is required for each one of the plurality of transmitters/receivers. For example, two single handshake transmitter/receiver combinations will have approximately the same number of gateways as one two handshake transmitter/receiver. This allows the implementation of a plurality of transmitter/receiver combinations without overly decreasing the area or real estate required on a chip or board upon which the device is installed.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 1B shows a logic table for a transfer of data using the conventional data transfer device shown in FIG. 1A;

FIG. 5 shows a logic table for a transfer of data from Side A to Side B using one embodiment of the present invention shown in FIG. 2 and utilizing a 4-phase data transfer scheme;

DETAILED DESCRIPTION OF THE PREFERRED EMBODIMENTS

Figure 2:
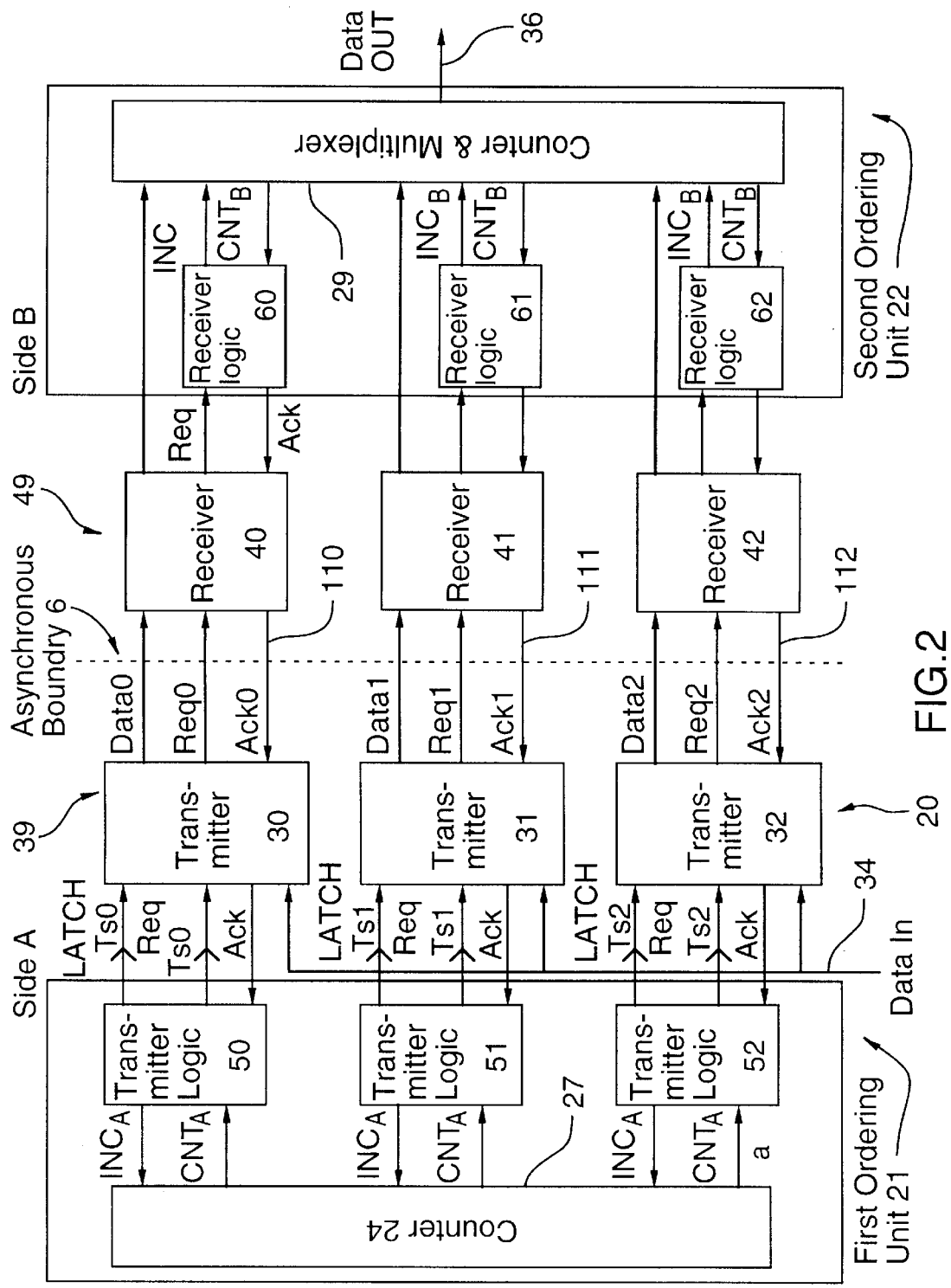
FIG. 2 shows a schematic diagram of an asynchronous data transfer device having multiple channels according to one embodiment of the present invention.

FIG. 2 shows a schematic diagram of a data transfer device, shown generally by reference numeral 20, according to one embodiment of the present invention. The device 20 is used to transfer, substantially simultaneously, multiple packets of data across an asynchronous boundary 6. The asynchronous boundary 6 separates a first time domain, located on Side A of the asynchronous boundary 6, from a second time domain, located on Side B of the asynchronous boundary 6.

Figure 1A:
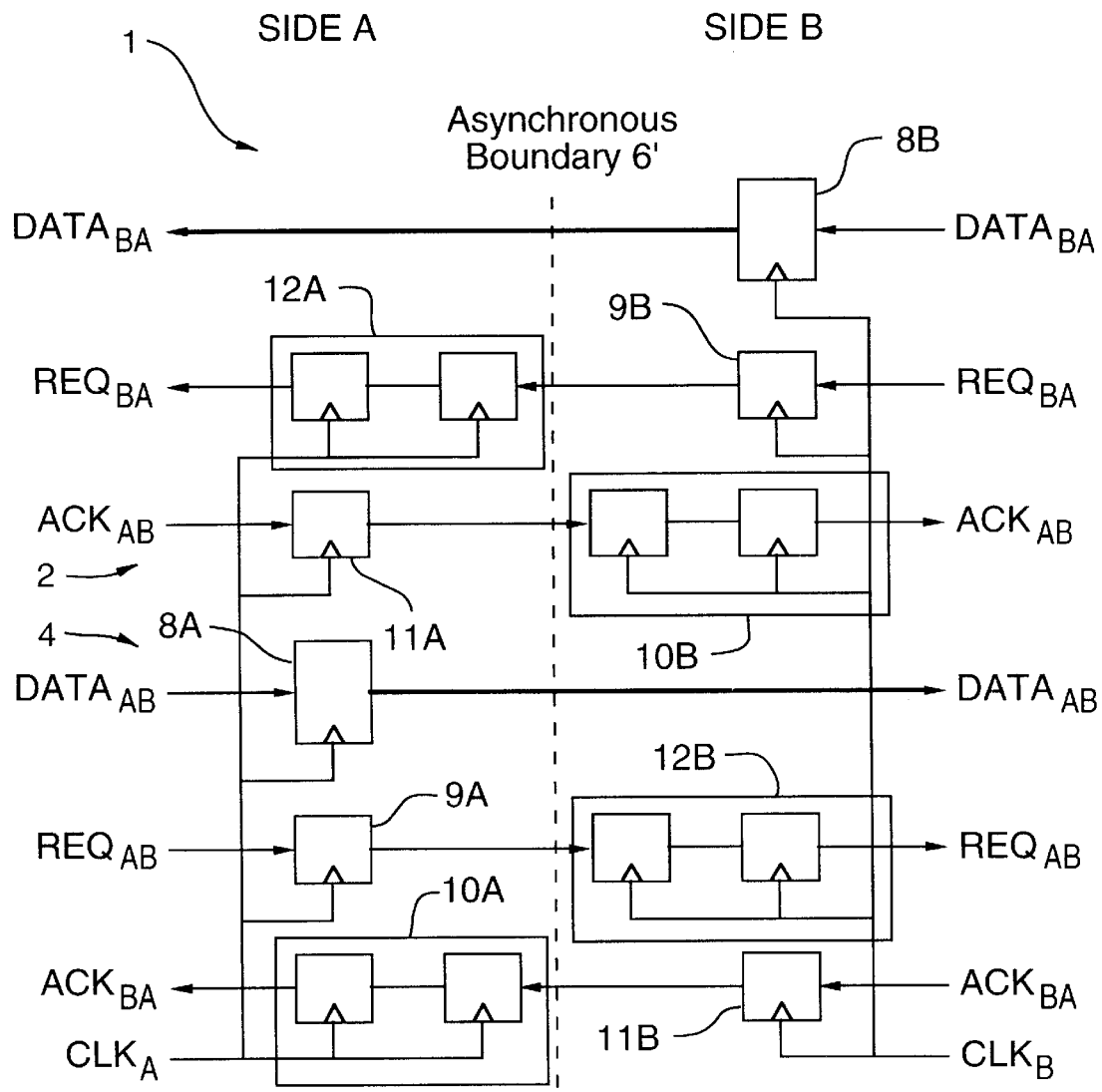
FIG. 1A shows a schematic drawing of a conventional data transfer device to transfer data across an asynchronous boundary.

The elements in the first time domain on Side A are connected to the first clock signal $CLK_A$ and the elements in the second time domain on Side B are connected to the second clock signal $CLK_B$, as is known in the art and as shown in FIG. 1A. The first clock signal $CLK_A$ and the second clock signal $CLK_B$ are not shown connected to the elements in FIG. 2 in order to clarify FIG. 2. Nevertheless, it is understood that each of the elements shown on Side A are connected to the first clock signal $CLK_a$, which is the clock for the first time domain, and each of the elements shown on Side B are connected to the second clock $CLK_B$, which is the clock signal for the second time domain.

The packets of data which the device 20 transfers across the asynchronous boundary 6 have a predetermined order which will generally correspond to the order in which the packets of data are presented on the first time domain data bus 34. The predetermined order of the packets of data must be preserved after they have been transferred across the asynchronous boundary 6. The packets of data will be outputted from the device 20 on databus 36 and the packets of data will only be useful to the second time domain if they are outputted on data bus 36 in the predetermined order.

The device 20 comprises a plurality of transmitters, shown generally by reference numeral 39, located in the first time domain. The plurality of transmitters 39 can comprise n transmitters, where n is an integer greater than 1. In other words, the plurality of transmitters 39 comprises two or more transmitters. In the embodiment shown in FIG. 2, the plurality of transmitters comprises three transmitters, shown by reference numerals 30, 31 and 32. Accordingly, in the embodiment shown in FIG. 2, n is equal to 3.

The device 20 further comprises a plurality of receivers, shown generally by reference numeral 49, located in the second time domain. The plurality of receivers 49 comprises n receivers and the receivers are marked by reference numerals 40, 41 and 42, respectively.

Each one of the plurality of receivers 49 receives packets of data transmitted by only one transmitter 30, 31, 32 of the plurality of transmitters 39. In other words, the device 20 comprises one receiver 40, 41, 42 for each transmitter 30, 31, 32 and each receiver 40, 41, 42 is associated with only one transmitter 30, 31, 32 for receiving packets of data from only the one associated transmitter 30, 31, 32. This is shown in FIG. 2 by transmitter 30 sending data signals $DATA_0$ to receiver 40 only. Likewise, transmitter 30 and receiver 40 exchange handshake signals $Req_0$ and $Ack_0$. The request signal $Req_0$ requests that the second time domain receive the packet of data being transmitted by transmitter 30 in the first time domain, and, the acknowledge signal $Ack_0$ acknowledges receipt by the receiver 40 in the second time domain of the packet of data transmitted by transmitter 30.

Likewise, transmitter 31 only sends its data signals Data1 to receiver 41 and transmitter 31 and receiver 41 exchange handshake signals, namely the request signal Req1 and the acknowledge signal Ack1. In addition, transmitter 32 only sends its data signals Data2 to receiver 42 and transmitter 32 and receiver 42 exchange handshake signals, namely the request signal Req2 and the acknowledge signal Ack2.

Accordingly, each transmitter 30, 31, 32 and its associated receiver 40, 41, 42 form a channel 110, 111, 112 for sending one packet of data across the asynchronous boundary 6 from the first time domain to the second time domain. Each channel 110, 111, 112 is simply a transmitter/receiver combination 30, 40, 31, 41, 32, 42 and, in one embodiment of the present invention, can comprise the transmitter/receiver 4 shown in FIG. 1A. In other words, the transmitter 30, for example, can comprise a flip-flop gateway (not shown) which sends the request signal Req0 to a synchronizer (not shown) in the receiver 40. Likewise, the receiver 40 can comprise a flip-flop gateway (not shown) for sending the acknowledge signal Ack0 to a synchronizer (not shown) in transmitter 30, similar to the transmitter/receiver 4 shown in FIG. 1A.

The data bus 34 is connected to each of the transmitters 30, 31, 32 and all packets of data on data bus 34 are presented to each of the transmitters 30, 31, 32 at the same time. The first ordering unit 21 will determine which one of the transmitters 30, 31, 32 will transmit the packet of data being presented on the data bus 34. The first ordering unit 21 sends a transmit signal $T_S$ to the one of the transmitters 30, 31, 32 which is to transmit the packet of data presented on the data bus 34 at any one time. The transmitters 30, 31, 32 will then transmit the packet of data on the data bus 34 in response to the transmit signal $T_S$.

In a preferred embodiment shown in FIG. 2, the transmit signal $T_S$ comprises three different transmit signals $T_{S0}$, $T_{S1}$, $T_{S2}$, one transmit signal $T_{S0}$, $T_{S1}$, $T_{S2}$ for each of the transmitters 30, 31, 32, respectively. In other words, the first ordering unit 21 will send n different transmit signals $T_{S0}$, $T_{S1}$, $T_{S2}$ one for each of the n transmitters 30, 31, 32 in the plurality of transmitters 39. The first ordering unit 21 will send only one transmit signal $T_{S0}$, $T_{S1}$, $T_{S2}$ at any one time so that only one transmitter 30, 31, 32 transmits the packet of data presented on the data bus 34 at that time. In this way, the first ordering unit 21 also causes the plurality of transmitters 39 to transmit the packets of data across the asynchronous boundary 6 in the predetermined order.

The transmit signal $T_S$ can be any type of signal to cause one of the plurality of transmitters 39 to transmit one packet of data presented on data bus 34. In the embodiment shown in FIG. 2, each transmit signal $T_{S0}$, $T_{S1}$, $T_{S2}$ comprises two separate signals, namely a latch signal LATCH and a request signal Req. The latch signal LATCH causes the transmitter 30 to store the packet of data on the data bus 34 at the time of receipt of the latch signal LATCH. The transmitter 30 may comprise a memory unit (not shown) which corresponds to memory units 8A and 8B of FIG. 1A, for storing the packet of data on the data bus 34. Once the packet of data is stored in the transmitter 30, the data signal DATA0 will correspond to the stored packet of data. The request signal Req from the first ordering unit 21 causes the transmitter 30 to send the request signal Req0 across the asynchronous boundary 6 to the associated receiver 40, thereby requesting the associated receiver 40 receive the packet of data which is represented by data signals Data0. The receiver 40 will send acknowledge signal Ack0 once the packet of data has been stored. Transmitters 31, 32 and the associated receivers 41, 42 will transfer packets of data in a similar manner.

The device 20 further comprises a second ordering unit 22 located in the second time domain. The second ordering unit 22 orders the packets of data received by the plurality of receivers 49 in the predetermined order and outputs the packets of data on the data bus 36 in the second time domain. The second ordering unit 22 outputs the data in the predetermined order so that the packets of data can be used by the second time domain.

In one embodiment, the first ordering unit 21 sequentially sends the transmit signal $T_S$ to each one of the plurality of transmitters 39 to transmit the packets of data in an order which corresponds to the predetermined order. The second ordering unit 22 then outputs the packets of data in the order in which the packets of data were transmitted by the plurality of transmitters 39, and which corresponds to the predetermined order.

In order to ensure that the second ordering unit 22 outputs the packets of the data in the order in which the packets were transmitted, the first ordering unit 21 sends the transmit signals $T_S$ to the plurality of transmitters 39 in a predetermined transmitting sequence and the second ordering unit 22 then outputs the packets of data received by the plurality of receivers 49 in a predetermined receiver sequence which corresponds to the predetermined transmitting sequence. The predetermined transmitting sequence can be any repeatable sequence. If the predetermined receiver sequence corresponds to the predetermined transmitter sequence, the packets of data are output from the plurality of receivers 49 in the same order in which the packets of data are transmitted by the plurality of transmitters 39, thereby preserving the predetermined order.

For example, the predetermined transmitter sequence could be transmitters 30, 31, 32, 30, 31, 32, 30, etc. and the predetermined receiver sequence corresponding to this transmitter sequence would be receivers 40, 41, 42, 40, 41, 42, 40, etc. If the first transmitter in the predetermined transmitter sequence, being transmitter 30 in the example given, was associated with the first receiver in the predetermined receiver sequence, namely receiver 40 in the example given, then the second ordering unit 22 would output the packets of data in the predetermined order simply by outputting the packets of data received from the receivers 40, 41, 42 in the predetermined receiver sequence. This is the case because the predetermined receiver sequence corresponds to the predetermined transmitter sequence and the predetermined receiver sequence commences with receiver 40, which is associated with transmitter 30, and transmitter 30 is the first transmitter in the predetermined transmitter sequence.

In order to sequentially send the transmit signals $T_{S0}$, $T_{S1}$, $T_{S2}$ to the transmitters 30, 31, 32 in the predetermined transmit sequence, the first ordering unit 21 comprises a first selecting unit 27 for repeatedly selecting each one of the transmitters 30, 31, 32 in the predetermined transmitter sequence. The first selecting unit 27 repeatedly selects one transmitter 30, 31, 32 of the plurality of transmitters 39 in the predetermined transmitter sequence. The first selecting unit 27 can be any kind of device which can select the transmitters 30, 31, 32 in the predetermined transmitter sequence. Likewise, the second ordering unit 22 comprises a second selecting unit 29 which repeatedly selects one of the plurality of receivers 49, commencing with a first receiver, which in this example is receiver 40, in the predetermined receiver sequence. The second selecting unit 29 can be any kind of device which selects one of receivers 40, 41, 42 in a predetermined receiver sequence which corresponds to the predetermined transmitter sequence.

In order to ensure that the data has been received by the receivers 40, 41, 42, it is preferable that the second ordering unit 22 output a packet of data from the receivers 40, 41, 42 immediately previously selected by the second selecting unit 29. In other words, if the second selecting unit 29 is presently selecting receiver 41 and previously selected receiver 40, the second ordering unit 22 will output the packet of data from receiver 40 because receiver 41 is likely still receiving a packet of data from transmitter 31 because the transmission of the packet of data from transmitter 31 to receiver 41 may not have been completed yet.

In a preferred embodiment, the first selecting unit 27 is a counter 24 which counts a Side A Count. The value of the Side A Count will be outputted by the Side A Count signals $CNT_A$. The Side A Count will have one value corresponding to each of the n transmitters. For example, the transmitters 30, 31, 32 could be associated with the values 0, 1, 2, respectively, and the Side A Count will comprise values 0, 1 and 2 such that when the Side A Count has a value 0, transmitter 30 is selected and the first ordering unit 21 sends the transmit signal $T_{S0}$ to transmitter 30. Likewise, when the Side A Count is 1, the first ordering unit 21 will send a transmit signal $T_{S1}$ to the transmitter 31 which corresponds to the Side A Count, and, when the Side A Count is 2, the first ordering unit 21 will send the transmit signal $T_{S2}$ to transmitter 32 which corresponds to a Side A Count of 2. In this way, the counter 24 will selectively send the transmit signal $T_{S0}$, $T_{S1}$, $T_{S2}$ to each one of the transmitters 30, 31, 32 in the predetermined transmitter sequence which corresponds to transmitters 30, 31, 32, 30, etc. This type of predetermined sequence is attractive because of its simplicity. It is also fairly simple to design and implement a counter 24.

The first ordering unit 21 further comprises one transmitter logic 50, 51, 52 for each of the transmitters 30, 31, 32, respectively. The transmitter logic 50, 51, 52 receives the Side A Count signal $CNT_A$ which represents the current Side A Count value. The transmitter logic 50, 51, 52 will then generate the appropriate transmit signals $T_{S0}$, $T_{S1}$, $T_{S2}$ to be sent to the transmitter 30, 31, 32 corresponding to the Side A Count value. The transmitter logic 50, 51, 52 also generates an increment signal $INC_A$ which is sent to the counter 24. The counter 24 increments the value of the Side A Count in response to the increment signal $INC_A$.

In the embodiment shown in FIG. 2, the second ordering unit 22 also comprises a counter 26 which counts a Side B Count. The Side B Count will have a value which corresponds to each one of the n receivers 40, 41, 42. In a preferred embodiment, as stated above, the second ordering unit 22 will output the packet of data from the immediately previously selected receiver 40, 41, 42. In the embodiment shown in FIG. 2, the second ordering unit 22 will output the packets of data received by the immediately previously selected receiver 40, 41, 42. In one embodiment, the second ordering unit 22 does this by outputting the data from the receiver 40, 41, 42 which corresponds to the Side B Count less 1. For example, if the receivers 40, 41, 42 correspond to the values 0, 1, 2, respectively, the Side B Count will count the values 0, 1 and 2 and repeatedly select the receivers 40, 41, 42 in the predetermined receiver sequence 40, 41, 42, 40, etc. which corresponds to the predetermined transmitter sequence 30, 31, 32, 30, etc. The second ordering unit 22 will output the packet of data received from the receiver 40, 41, 42 having the immediately previous value. For example, when the Side B Count has a value 1, the second ordering unit 22 will output the packet of data received from receiver 40 (1−1=→0 corresponding to receiver 40) and when the Side B Count has a value 2, the second ordering unit 22 will output the packet of data received by receiver 41 (2−1=→1 corresponding to receiver 41). When the Side B Count has the value 0, the second ordering unit 22 will output the packet of data received by receiver 42, which corresponds to the Side B Count less 1 (0−1=→2), because the Side B Count does not have negative values.

In a preferred embodiment, the second ordering unit 22 comprises a multiplexer for outputting the packets of data received by the receivers 40, 41, 42. As shown in FIG. 2, the second ordering unit 22 can comprise a combination counter and multiplexer 26. The counter and multiplexer 26 receives all of the packets of the data from the receivers 40, 41, 42 in the predetermined receiver sequence and output the data on the data bus 36 in the predetermined order. In this way, the counter and multiplexer 26 function as an additional buffer between the receivers 40, 41, 42 and the rest of the elements in the second time domain. However, the second ordering unit 22 could simply comprise a counter (not shown) which places the data received by the receivers 40, 41, 42 directly onto a data bus 36 for use by the elements in the second time domain. The second ordering unit 22 could also comprise a separate counter (not shown) and multiplexer (not shown).

The second ordering unit 22 comprises one receiver logic 60, 61, 62 for each of the receivers 40, 41, 42, respectively. The receiver logic 60, 61, 62 receives the Side B Count signal $CNT_B$ which represents the current Side A Count value. The receiver logic 60, 61, 62 will only permit the selected receiver 40, 41, 42 to send the acknowledge signal Ack0, Ack1, Ack2 to thereby complete the handshake procedure for a packet of data. Each of the receiver logic 60, 61, 62 also generates a Side B increment signal $INC_B$ which causes the counter and multiplexer 26 to increase the value of the Side B Count. The receiver logic 60, 61, 62 selects the receiver 40, 41, 42 which corresponds to the Side B Count value representing the Side B Count signal $CNT_B$. The counter and multiplexer 26 output the packet of data received by the immediately previously selected receiver 40, 41, 42.

Figure 3:
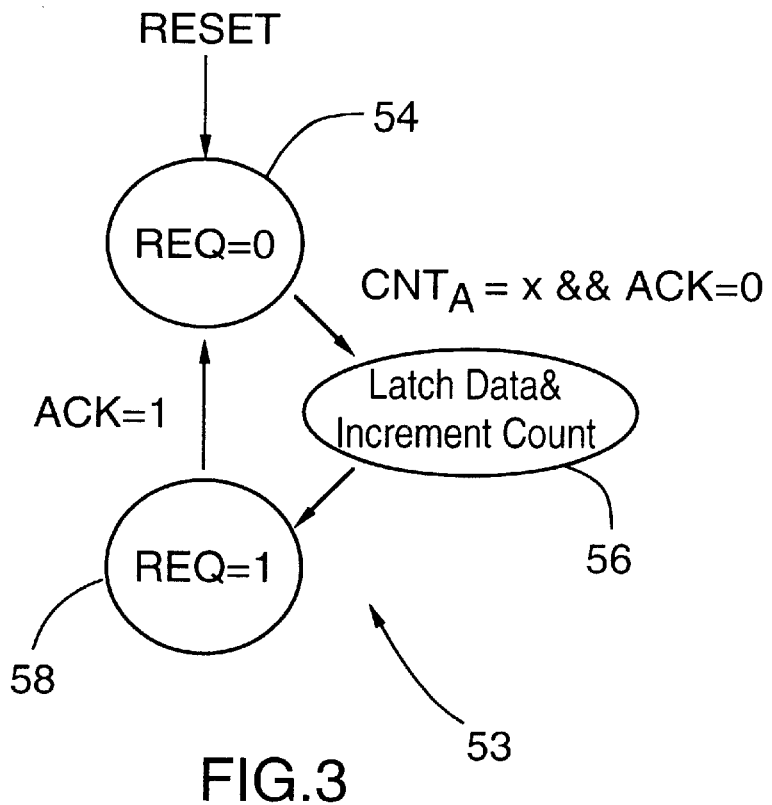
FIG. 3 shows a logic diagram for the transmitter logic on Side A of the embodiment of the invention shown in FIG. 2 and utilizing a 4-phase data transfer scheme.
Figure 4:
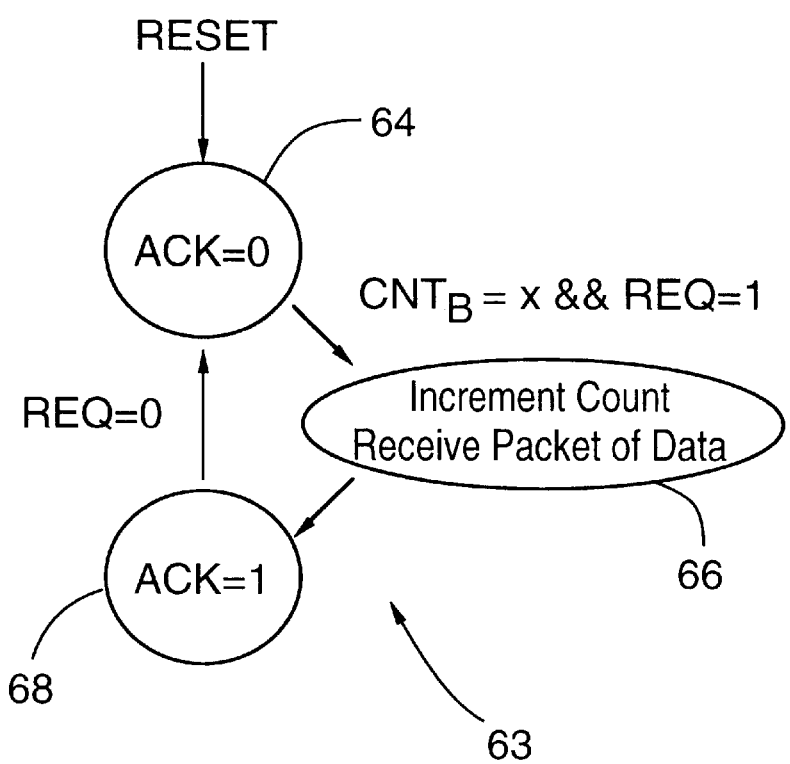
FIG. 4 shows a logic diagram for the receiver logic on Side B of the embodiment of the invention shown in FIG. 2 and utilizing a 4-phase data transfer scheme.

FIGS. 3 and 4 show logic diagrams 53 and 63, respectively. Logic diagram 53 illustrates the logic followed by each of the transmitter logic 50, 51, 52. Logic diagram 63 illustrates the logic followed by each of the receiver logic 60, 61, 62. The value x is the corresponding value for the transmitter 30, 31, 32 and the receiver 40, 41, 42. Therefore, in the present example, for transmitter logic 50 and receiver logic 60, x is "0". For transmitter logic 51 and receiver logic 61, x is "1" and for transmitter logic 52 and receiver logic 62, x is "2".

As seen from FIGS. 3 and 4, at reset all of the request signals are low represented by REQ=0 in step 54 and all of the acknowledge signals are low represented by the symbol ACK=0 in step 64. At reset, the Side A Count has a value 0, selecting the first transmitter 30 in the predetermined transmitter sequence 30, 31, 32, and, the Side B Count has a value 0 representing the first receiver 40 in the predetermined receiver sequence 40, 41, 42. Therefore, the condition shown in FIG. 3 of "$CNT_A$=x && ACK=0" is satisfied for transmitter 30 because the value of the Side A Count is ($CNT_A$=0), which corresponds to transmitter 30 and the acknowledge signal Ack0 for transmitter 30 is low. The transmitter logic 50 will then proceed to step 56 and send the transmit signal $T_{S0}$ by sending the latch signal LATCH instructing the transmitter 30 to latch the packet of data presented on data bus 34 and by sending the request signal Req instructing transmitter 30 to send the request signal Req0 across the asynchronous boundary 6 to the receiver 40.

As also shown in step 56, the transmitter logic 50 will increment the Side A Count by sending the increment count signal $INC_A$ to counter 24. Transmitter 30 will now commence transmission of the first packet of data A across the asynchronous boundary 6.

In the meantime, if a second packet of data B presents itself on data bus 34, count signal $CNT_A$ will now have the value 1, corresponding to transmitter 31 and the logic condition "$CNT_A$=x && ACK=0" is satisfied for transmitter 31. The first ordering unit 21 will then send the transmit signal $T_{S1}$ to transmitter 31. In response to the transmit signal $T_{S1}$, the transmitter 31 will latch the next packet of data B on the data bus 34 and assert the request signal Req1. Transmitter logic 51 will also increment the count by sending the increment count signal $INC_A$ to the counter 24.

While steps 54, 56 and 58 are followed by transmitter logic 51, transmitter 30 is completing its transmission of data packet A across the asynchronous boundary 6 independently of transmitter 31. The same procedure will then be repeated for the third packet of data C by transmitter logic 52 sending the transmission signal $T_{S2}$ to transmitter 32. It should be noted that the condition "$CNT_A$=x && ACK=0" cannot be satisfied for more than one transmitter 30, 31, 32 at any one time because Side A Count will only correspond to one transmitter 30, 31, 32.

Referring to logic diagram 63, once transmitter 30 sends request signal Req0 and because the value of the Side B counter $CNT_B$ is equal to 0, corresponding to receiver 40, the receiver logic 60 will proceed to step 66 and increment the Side B Count by sending the increment signal $INC_B$. The receiver logic 60 will then proceed to step 68 and send the acknowledge signal Ack instructing the selected receiver 40 to send acknowledge signal Ack0 across the asynchronous boundary 6 to transmitter 30. Once the transmitter 30 de-asserts the request signal Req0, shown in step 54 of FIG. 3, the condition REQ=0 for receiver 40 will be satisfied and the receiver logic 60 will proceed back to step 64, de-asserting the acknowledge signal Ack. This signals the completion of the transmission of data packet A across the asynchronous boundary 6 by transmitter 30 and receiver 40. In a similar manner, data packets B and C will be received by receivers 41 and 42, respectively.

Each time the count is incremented by one of the receiver logic 60, 61, 62 at step 66, the second ordering unit 22 will output the packet of data received from the immediately previous receiver 40, 41, 42. It should be noted that the condition "$CNT_b$=x && REQ=1" can only be satisfied by one receiver logic 60, 61, 62 at any one time so that only one of the receiver logic 60, 61, 62 can increment the Side B Count, and, only one of the receivers 40, 41, 42 can send the acknowledge signals Ack0, Ack1, Ack2 at any one time.

Accordingly, the logic for each of the transmitter logic 50, 51, 52 can be summarized as follows:

Upon reset, $CNT_A$=0 and $Req_Y$ is low for all of the transmitters 30, 31, 32;

If $Req_X$ and $Ack_k$ are both low and a data transfer is required, send transmit signal $T_S$ to store data on data bus 34 into transmitter 3x, assert $Req_X$ and increment the value of $CNT_A$;

Whenever $Ack_Y$ is asserted, de-assert $Req_Y$;

Where x corresponds to the value of the Side A Count $CNT_A$ and y corresponds to any one of the values 1 to n.

The logic for the receiver logic 60, 61, 62 can be summarized as follows:

Upon reset, $CNT_A$=0 and $Ack_Y$ is low for all of the receivers 40, 41, 42;

If $Req_X$ is high and $Ack_X$ is low, receive packet of data represented by $DATA_X$, assert $Ack_X$ and increment value of Side B Count $CNT_B$;

At any time, if $Req_Y$ is de-asserted, de-assert $Ack_Y$.

Where x corresponds to the value of the Side B Count $CNT_B$ and y corresponds to any one of the values 1 to n.

It is understood that the reset states summarized above and shown in FIGS. 3 and 4 could differ. The reset state will simply determine which transmitters 30, 31, 32 will start transmitting first.

FIG. 5 shows a logic table 120 which illustrates the transitions on Side A and Side B during a transfer of several packets of data across the asynchronous boundary 6 in a 4-phase implementation. The packets of data are presented in a data bus 34 in the predetermined order, A, B, C, D, E and F. For convenience, changes in the signals in logic table 120 are indicated in bold. Also, table 120 includes a column with the Side A Count value and a column with the Side B Count value.

Steps 1 to 4 of table 120 show the transitions which occur on Side A when packets of data A, B, C are transmitted on the transmitters 30, 31, 32. During steps 1 to 4, the acknowledge signals $ACK_0$, $ACK_1$, $ACK_2$ are all equal to 0 or low. Therefore, as the Side A Count changes from 0, to 1, to 2, and back to 0, the condition "$CNT_A=x$ && $ACK=0$" shown in FIG. 3 is satisfied in turn for the transmitter logic 50, 51, 52. Accordingly, the first ordering unit 21 sends the transmit signals $T_{S0}$, $T_{S1}$, $T_{S2}$ to the receivers 30, 31, 32 as shown by the transitions at steps 2, 3 and 4.

From steps 5 to 9, the Side A Count remains at 0 while the transmit logic 50 waits for the acknowledge signal $ACK_0$ from receiver 40 to go low. Once the acknowledge signal $ACK_0$ goes low, as shown in step 9, and because the Side A Count is 0, the condition "$CNT_A=x$ && $ACK=0$" for the transmitter logic 50 is again satisfied and the transmitter logic 50 sends the transmit signal $T_{S0}$ to the transmitter 30. This is reflected in step 10 by the value in column $DATA_0$ changing to "D" reflecting that packet of data D has been stored in transmitter 30 and is being asserted on data signals $DATA_0$. Likewise, the request signal $REQ_0$ has changed to 1. The transmitter logic 50 has also sent the increment signal $INC_A$ which is reflected by the Side A Count incrementing from 0 to 1 at step 10. Steps 10 to 12 show the Side A logic sending the transmit signals $T_{S0}$, $T_{S1}$, $T_{S2}$ to transmitters 30, 31, 32 to transmit the packets of data D, E and F, similar to steps 2 to 4 of table 120.

During steps 4 to 9, the Side B Count changes in value as shown by the Side B Count column in table 120. For example, at step 3, the receiver 40 has received the request signal $REQ_0$ from transmitter 30 and the data signals $DATA_0$ correspond to the packet of data A. As the Side B Count at step 3 is also 0, the condition "$CNT_B=x$ && $REQ=1$" is satisfied for transmitter logic 60. Transmitter logic 60 will then send the increment Side B Count signal $INC_B$ to the counter and multiplexer 26 and also instruct the receiver 40 to assert the acknowledge signal $ACK_0$. This is shown in step 4 by the acknowledge signal $ACK_0$ being asserted on the Side B column and by the Side B Count incrementing to 1. This step will then be repeated for each of receivers 41 and 42.

The DATA OUT column shows the data being outputted on data bus 36 from the counter and multiplexer 26, which, as shown in steps 4 to 6, corresponds to the packet of data of the immediately previously selected receiver. For example, at step 4 the Side B Count has a value 1 corresponding to receiver 41, but data packet A which corresponds to the packet of data received immediately previously selected receiver 40 is being outputted. As shown in steps 4 to 7, the transition in the Side B Count from 1 to 2 to 0 is followed by the counter and multiplexer 26 outputting the packets of data A, B and C which corresponds to the packets of data received by the receivers 40, 41, 42 having a value one less than the value of the Side B Count. The process will then be repeated for packets of data D, E and F.

Logic table 120 illustrates how the packets of data A, B, C, D, E and F are transmitted across the asynchronous boundary 6, but retain the predetermined order A, B, C, D, E and F. Logic table 120 also shows how the Side A Count can be used to repeatedly select the receivers 30, 31, 32 in the predetermined receiver sequence to transmit the packets of data and how the Side B Count can be used to repeatedly select the receivers 40, 41, 42 in the predetermined receiver sequence to receive the data. Logic table 120 also shows how the received packets of data are outputted from the immediately previously selected receiver 40, 41, 42.

Table 120 also shows how the first ordering unit 21 will cause a transmit signal $T_S$ to be sent to the selected transmitter 30, 31 and 32 and how the second ordering unit 22 will only cause the receiver 40, 41, 42 to send its acknowledge signal $ACK_0$, $ACK_1$, $ACK_2$ after the receiver 40, 41, 42 has been selected. This ensures that the transmitters 30, 31, 32 do not transmit a next packet of data before the second time domain has received a previous packet of data and that no more than one packet of data is received at any one time so that the predetermined order is preserved.

Figure 6:
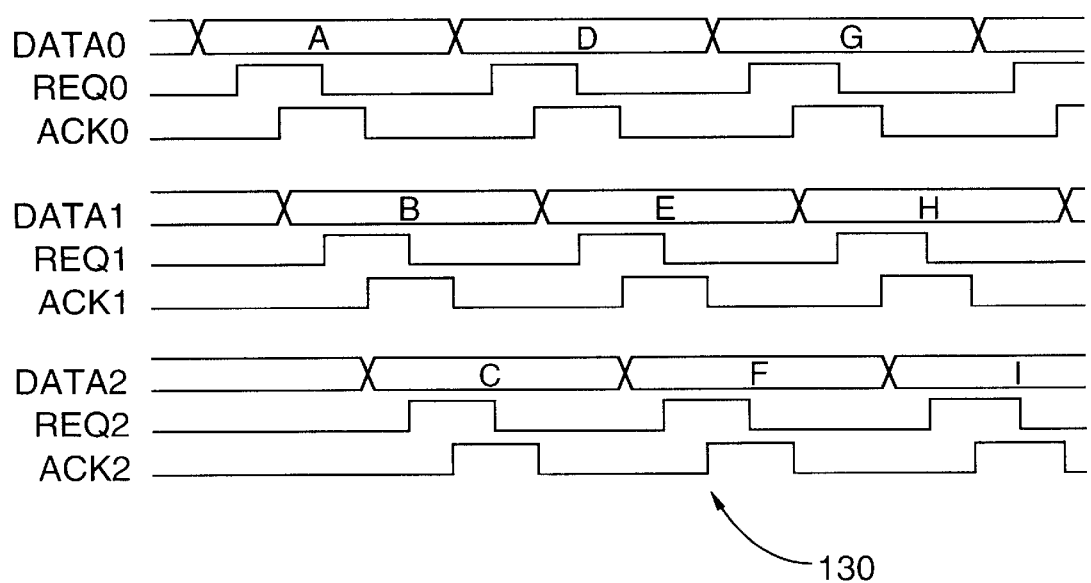
FIG. 6 shows a timing diagram of the signals across the asynchronous boundary in a 4-phase implementation of the device shown in FIG. 2.

FIG. 6 shows a timing diagram, shown generally by reference numeral 130, of the signals DATA0, REQ0, ACK0, DATA1, REQ1, ACK1, DATA2, REQ2, ACK2 across the asynchronous boundary 6 of the device 20 shown in FIG. 2 and utilizing a 4-phase data transfer scheme. The timing diagram 130 shows how packets of data A, B and C can all be transferred at substantially the same time across the asynchronous boundary 6 which increases throughput and decreases latency. This is also the case with packets of data D, E and F and packets of data G, H and I. Timing diagram 130 also illustrates the transitions of the handshake signals across the asynchronous boundary 6 corresponding to the transitions shown in logic table 120.

Figure 7A:
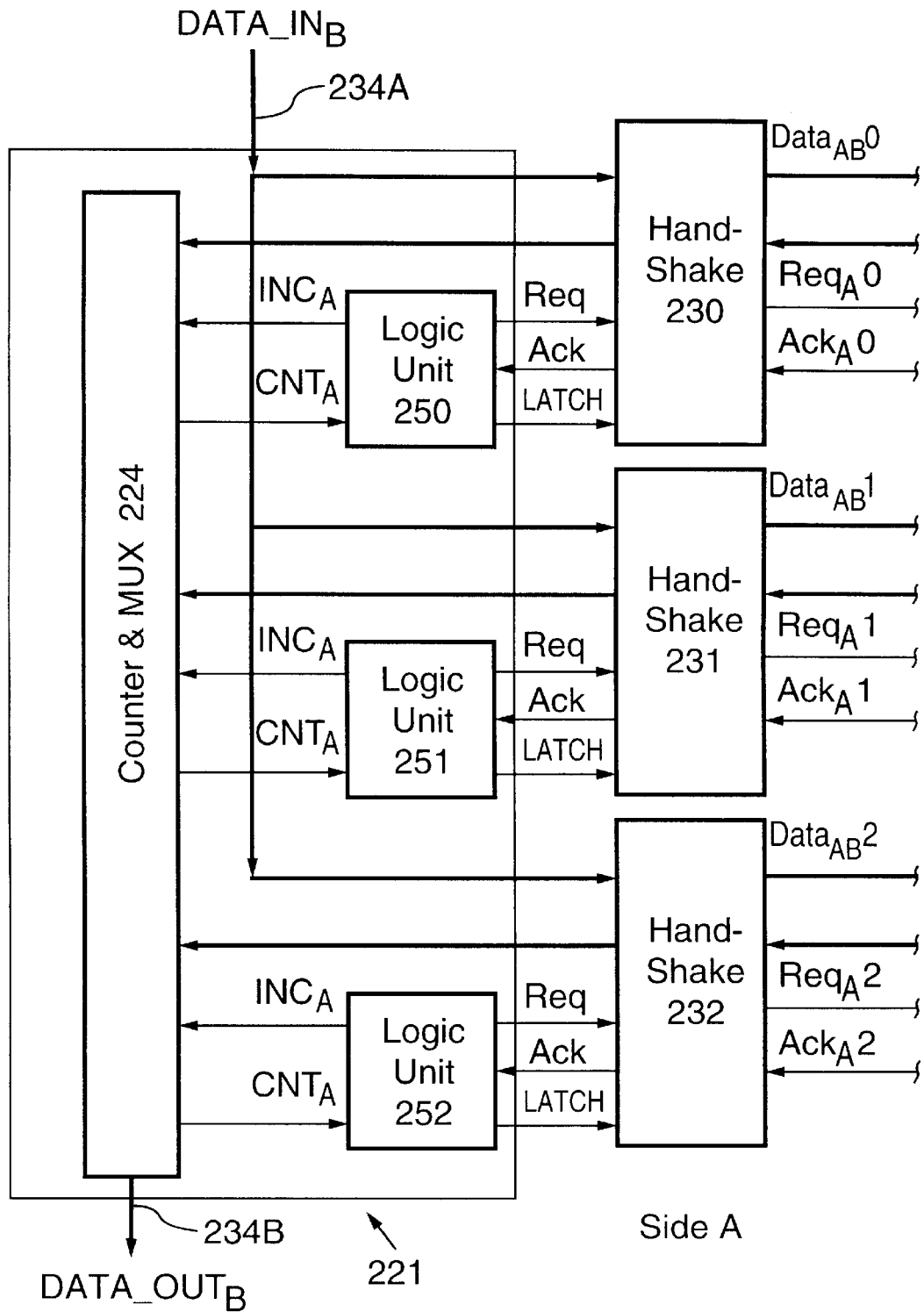
FIG. 7 shows a schematic diagram of an asynchronous data transfer device according to a further embodiment of the present invention utilizing single handshake transmitters/receivers.
Figure 7B:
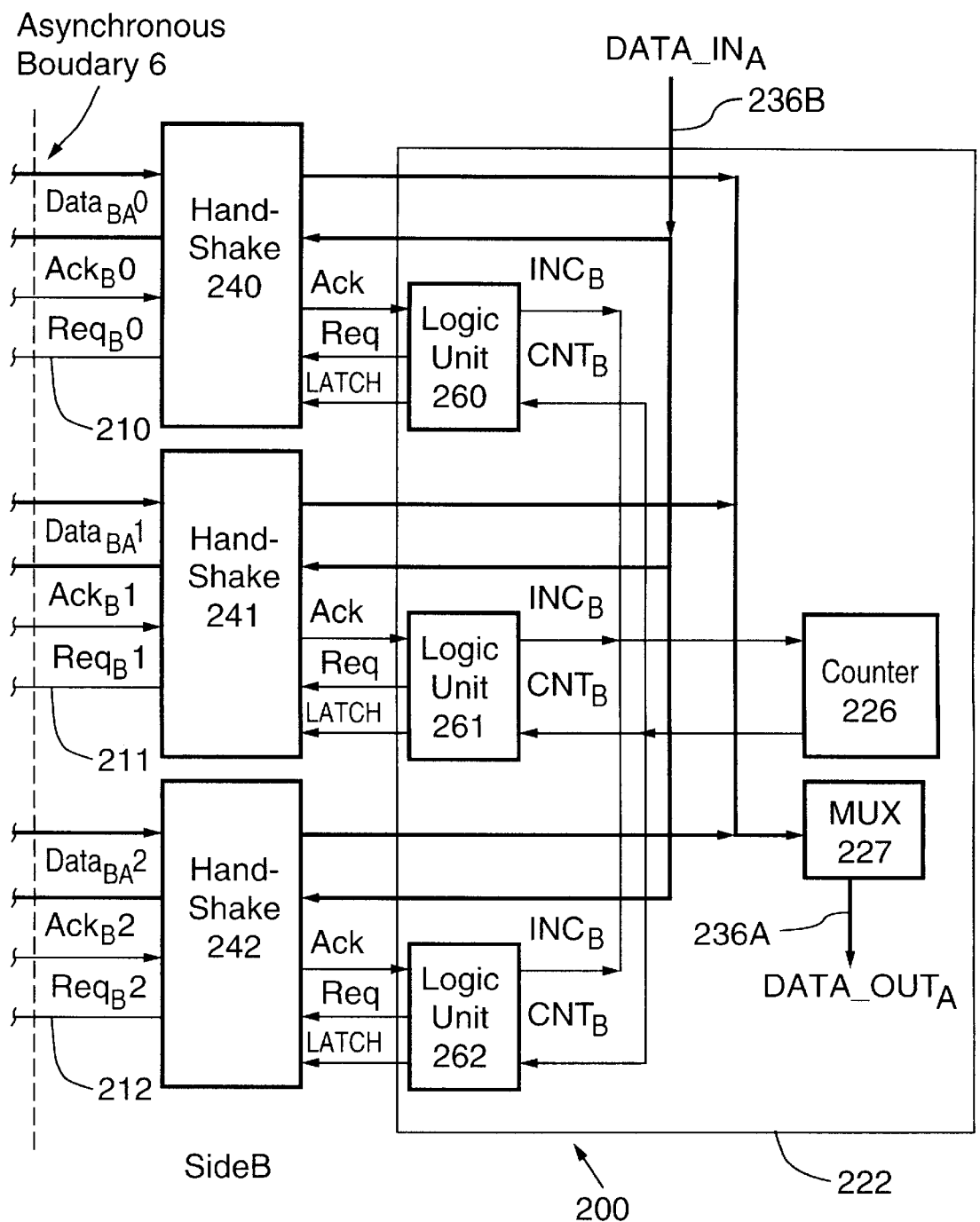

FIG. 7 shows a device 200 according to a further embodiment of the present invention. The device 200 is similar to the device 20 shown in FIG. 2 in that a plurality of channels 210, 211 and 212 are used to send packets of data across the asynchronous boundary 6. However, the channels 210, 211, 212 are bi-directional in that they can send packets of data from the first time domain on Side A to the second time domain on Side B, and from the second time domain on Side B to the first time domain on Side A.

To supply packets of data to and from the bi-directional channels 210, 211, 212, the first time domain comprises a first uni-directional data bus 234A for sending data to the channels 210, 211, 212 for transmission to the second time domain, and, a second unidirectional data bus 234B for sending packets of data received from the second time domain to the first time domain. Likewise, the second time domain has a first uni-directional data bus 236A for outputting packets of data received from the first time domain and a second uni-directional data bus 236B for inputting packets of data to be sent to the first time domain.

The first ordering unit 221 in the device 200 comprises a combination counter and multiplexer 224. The combination counter and multiplexer 224 counts the values of the Side A Count and also outputs the packets of data received from the second time domain on the second data bus 234B in the order in which the packets of data are received. Likewise, the second ordering unit 222 comprises a counter 226 and multiplexer 227. In the device 200, the counter 226 and the multiplexer 227 are shown as separate elements, but they could also be a combination, such as combination counter and multiplexer 224 and such as the combination counter and multiplexer 26 shown in FIG. 2. The multiplexer 227 outputs the packets of data received from the first time domain on data bus 236B in the order in which they are received.

As with the device 20 shown in FIG. 2, the device 200 preserves the predetermined order of the packets of data by the first ordering unit 221 causing the handshake units 230, 231, 232 to transmit the packets of data from the first time domain in a first predetermined transmitting sequence and the second ordering unit 222 receiving the packets of data from the handshake units 240, 241, 242 in a first predetermined receiving sequence corresponding to the first predetermined transmitting sequence. Likewise, the second ordering unit 222 causes the handshake units 240, 241, 242 to transmit the packets of data from the second time domain in a second predetermined transmitter sequence and the first ordering unit 221 receives the packets of data from handshake units 230, 231, 232 in a second receiving sequence which corresponds to the second predetermined transmitting sequence. Preferably, the first predetermined transmitting sequence identifies the same channel 210, 211, 212 as the second predetermined receiving sequence and the second predetermined transmitting sequence identifies the same channel 200, 211, 212 as the first predetermined receiving sequence.

Preferably, the channels 210, 211, 212 comprise bi-directional single handshake units 230, 240, 231, 241, 232, 242. Bi-directional single handshake units 230, 240, 231, 241, 232, 242 are units wherein a single handshake both acknowledges receipt of a previous packet of data and requests transmission of a new packet of data. The bi-directional single handshake units 230, 240, 231, 241, 232, 242 are more fully described in co-pending application Ser. No. 08/961,150 entitled "Bi-Directional Asynchronous Transfer Scheme Using A Single Handshake" invented by the same inventors as this invention and assigned to the same assignor, and which is incorporated herein by reference.

Figure 8:
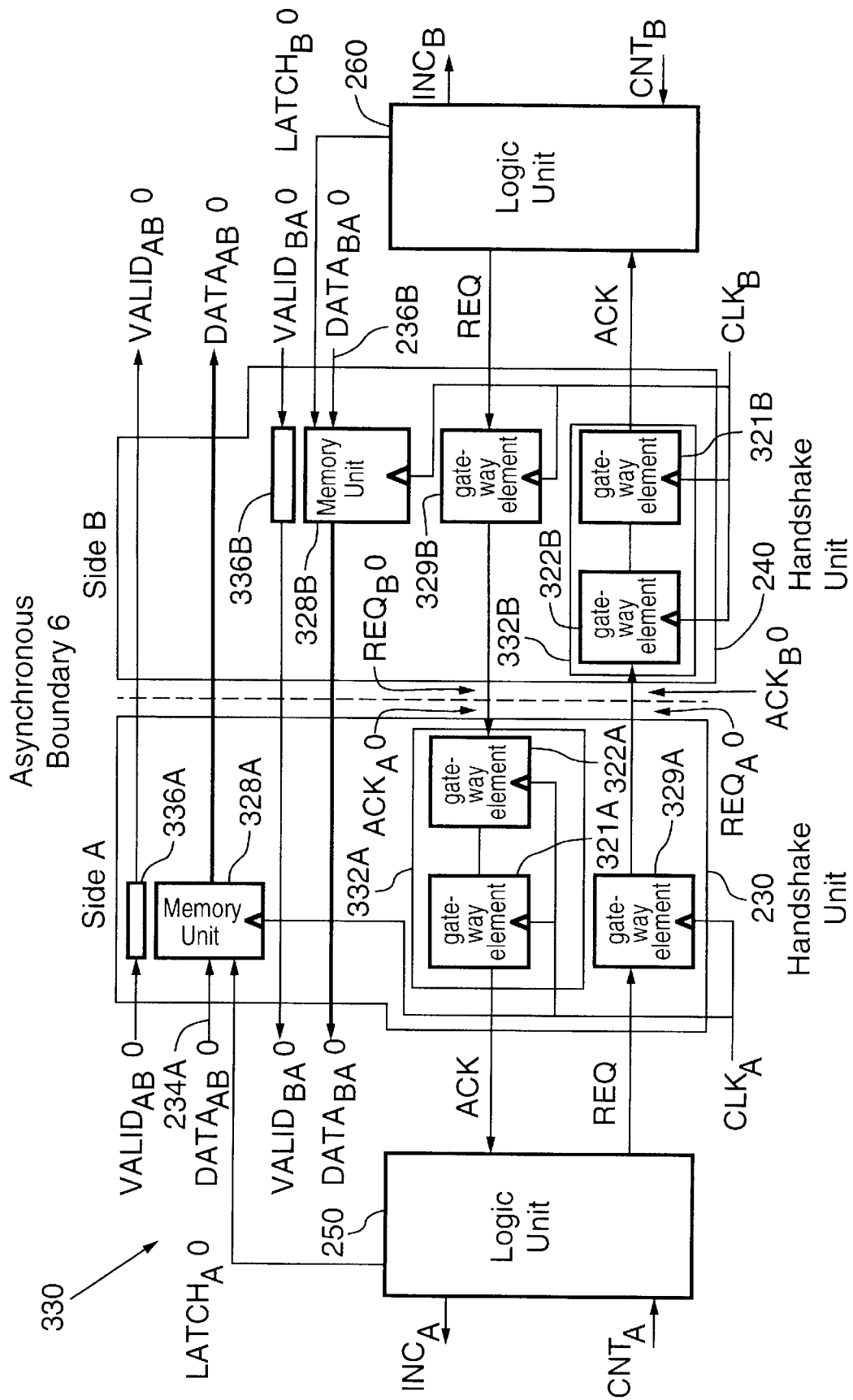
FIG. 8 shows a schematic diagram of a bi-directional asynchronous data transfer device utilizing a single handshake transmitter/receiver utilized in the embodiment of the present invention shown in FIG. 7.

FIG. 8 shows channel 210 having bi-directional single handshake units 230, 240 according to one embodiment of the present invention. As shown in FIG. 8, bi-directional single handshake unit 230 is located in the first time domain on Side A of the asynchronous boundary 6 and the elements of the bi-directional single handshake unit 230 are connected to the first clock signal $CLK_A$. Likewise, bi-directional single handshake unit 240 is located in the second time domain on Side B of the asynchronous boundary 6 and the elements of the bi-directional single handshake unit 240 are connected to the second clock signal $CLK_B$.

Packets of data to be sent from the first time domain on Side A to the second time domain on Side B are sent to and stored in the first memory unit 328A by data bus 234A. Likewise, packets of data to be sent from the second time domain to the first time domain are stored in the second memory unit 328B located in the second time domain. In a preferred embodiment, the memory units 328A, 328B are flip-flop gateways sized to store a number of bits corresponding to the number of bits in the packets of data, but it is understood that any type of memory storage element can be used with the memory units 328A, 328B.

The bi-directional single handshake units 230, 240 preferably comprise synchronizers 332A and 332B which receive the control signals $REQ_B0$ and $REQ_A0$, respectively. Synchronizer 332A comprises two flip-flop elements 321A and 322A connected in series.

Synchronizer 332A receives the request signal $REQ_B0$ from bi-directional single handshake unit 240 and sends it to the Side A logic unit 250 for bi-directional single handshake unit 230. The request signal $REQ_B0$ from the second time domain requests that the bi-directional single handshake unit 230 receive a packet of data from the second time domain. In addition, the request signal $REQ_B0$ acknowledges receipt by the second time domain of a packet of data immediately previously sent from bi-directional single handshake unit 230 in the first time domain to the bi-directional single handshake unit 240 in the second time domain. The request signal $REQ_B0$ in the second time domain is also shown as the acknowledge signal $ACK_A0$ in the first time domain, because the request control signal $REQ_B0$ functions as both an acknowledge signal for the first time domain and a request signal for the second time domain.

The logic unit 250 generates the request control signal $REQ_A0$ which is sent to the second time domain by means of the flip-flop element 329A located in the bi-directional single handshake unit 230. The logic unit 250 will generate the control signal $REQ_A0$ and the latch signal $LATCH_A0$ when there is a packet of data to be sent to the second time domain and the logic incorporated in the logic unit 250 determines that it can send the transmit signal $T_{SO}$.

The Side B bi-directional single handshake unit 240 and logic unit 260 have a similar structure to the structure of the bi-directional single handshake unit 230 and the logic unit 250 in Side A. In particular, the bi-directional single handshake unit 240 preferably comprises a synchronizer 332B having two flip-flop elements 322B and 321B connected in series. Synchronizer 332B receives the request control signal $REQ_A0$ from the first time domain and sends it to the Side B logic unit 260. The request control signal $REQ_A0$ from the first time domain, when in the second time domain, is shown as acknowledge signal $ACK_B0$. This illustrates that the request signal $REQ_A0$ from the first time domain performs the dual function of requesting that the second time domain receive a next packet of data from the first time domain, and, acknowledging receipt by the first time domain of an immediately previous packet of data sent from the second time domain, as was the case with the second request signal $REQ_B0$.

When there is a packet of data to be sent from the second time domain to the first time domain, the Side B logic unit 260 will generate the request control signal $REQ_B0$, which is sent by flip-flop element 329B across the asynchronous boundary 6. The logic unit 260 will also generate the latch signal $LATCH_B0$ instructing the memory unit 328B to store the packet of data being presented on the data bus 236A.

The gateway elements 321A, 322A and 329A in bi-directional single handshake unit 230, together with the logic unit 250, cooperate to control the exchange of data across the asynchronous boundary 6. Likewise, the gateway elements 321B, 322B and 329B, together with the Side B logic 260, form a control unit to control the exchange of data across the asynchronous boundary 6 from the second time domain.

Figure 9:
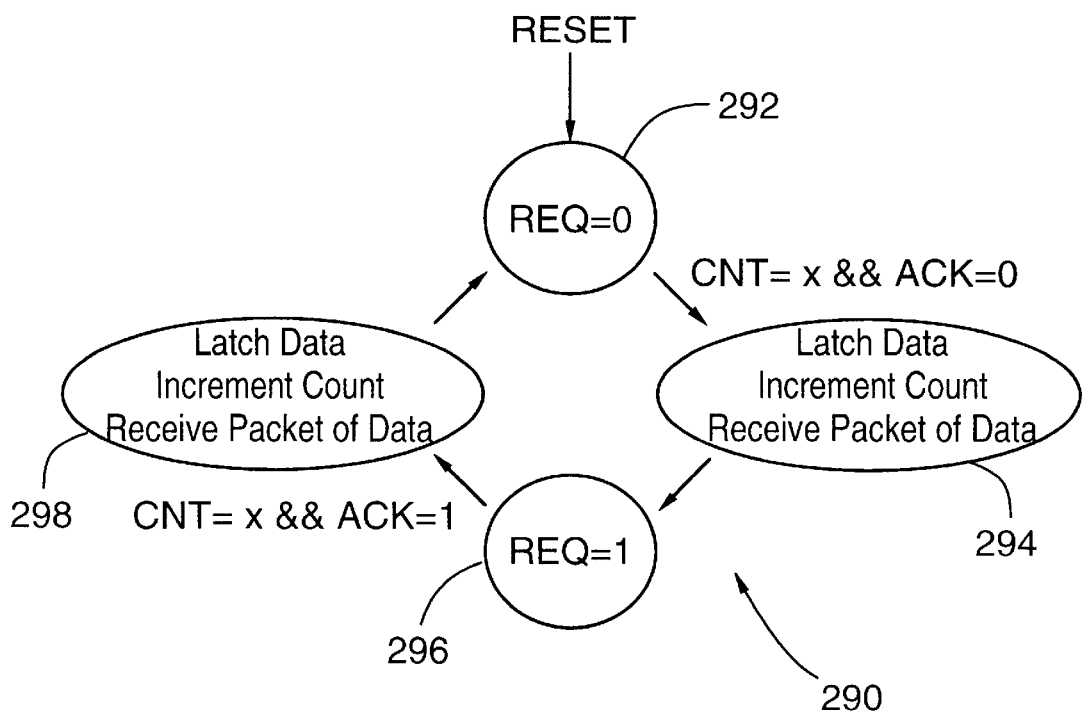
FIG. 9 shows a logic diagram for the logic of each of the single handshake transmitters/receivers of the embodiment of the invention shown in FIG. 7 utilizing a 2-phase data transfer scheme.

The logic implemented by logic units 250, 251, 252, 260, 261, 262 are substantially identical and are illustrated by the logic diagram 290 shown in FIG. 9. At reset, the request signals REQ are low, shown by the symbol REQ=0 in step 292. As a single handshake is used in this embodiment, by having the request signals REQ low, the acknowledge signal ACK will also be low.

The counter and multiplexer 224 will count a Side A Count and the counter 226 will count a Side B Count, as was the case with the embodiment shown in FIG. 2. Likewise, the value of the Side A Count will correspond to one of the three bi-directional single handshake units 230, 231, 232 on Side A, as was the case with the transmitters 30, 31, 32 in the embodiment shown in FIG. 2. Also, the value of the Side B Count will correspond to one of the bi-directional single handshake units 240, 241, 242 on Side B, as was the case with the receivers 40, 41, 42 in the embodiment shown in FIG. 2.

The logic diagram 290 will now be described with respect to the first bi-directional single handshake unit 230 and Side A logic unit 250, with the understanding that each of the other handshake units 231, 232 and their corresponding Side A logic units 251, 252 will operate in the same way. The logic diagram 290 shows a 2-phase implementation of the device 200 meaning that the request signal REQ and the acknowledge signal ACK are sent each time there is a transition from low to high or high to low.

When the value of the Side A Count corresponds to the bi-directional single handshake unit 230, namely when Side A Count is equal to 0, and the acknowledge signal $ACK_A0$ is low, the condition "CNT=x && ACK=0" is satisfied for the Side A logic unit 250. The Side A logic unit 250 will then proceed to step 294 and latch the packet of data by sending latch signal $LATCH_A0$, increment the count by sending the increment count signal $INC_A$ and receive any valid packet of data represented by data signals $DATA_{BA}$. The logic unit 250 will then proceed to step 296 and send the request signal $REQ_A0$, shown by the symbol "REQ=1". Sending the latch signal $LATCH_A0$ and sending the request signal REQ to the bi-directional single handshake unit 230 corresponds to sending a transmit signal $T_S$ as described above.

As the Side A Count is incremented by the increment count signal $INC_A$, the condition "CNT=x && ACK=0" will then be satisfied for the next bi-directional single handshake units 231 and 232. These units 231, 232 will commence transference of a packet of data when the Side A Count has a value which corresponds to them. After bi-directional single handshake unit 232 has sent its increment count signal $INC_A$, the value of the Side A Count will again return to 0, corresponding to bi-directional single handshake unit 230. If the acknowledge signal $ACK_A0$ from the bi-directional single handshake unit 240 has been received, then the condition "CNT=x && ACK=1" will again be satisfied for bi-directional single handshake unit 230. The Side A logic 250 will then proceed to step 298, namely latching the data by sending the latch signal $LATCH_A0$, incrementing the Side A Count by sending the increment Side A Count signal $INC_A$ and receiving any valid packet of data represented by data signals $DATA_{BA}$. Side A logic unit 250 will then proceed to step 292, namely REQ=0 and send the request signal $REQ_A0$.

The Side B logic units 260, 261, 262 also follow the logic shown in logic diagram 290. However, the symbol CNT=x for the Side B logic units 260, 261, 262 refers to the Side B Count $CNT_B$, rather than the Side A Count $CNT_A$ referred to above with respect to the Side A logic unit 250. Otherwise, the Side A logic units 250, 251, 252 follow the same logic as the Side B logic units 260, 261, 262.

Accordingly, for the embodiment shown in FIG. 7, the logic for each of the Side A logic units 250, 251, 252 in a 2-phase implementation can be summarized as follows:

Upon reset, $CNT_A=0$ and $Req_Ay$ and $Req_By$ is low for all bi-directional single handshake units 230, 231, 232, 240, 241, 242;

If $Req_Ax=Ack_Ax$;

(i) commence data transfer, i.e. receive, by latching or using, the packet of data represented by data signal $DATA_{BA}x$ and store a next packet of data to be sent to the second time domain into the memory unit 328A of the handshake unit 23x;

(ii) increment the value of Side A Count $CNT_A$; and (iii) generate the request control signal $Req_Ax$ by causing a transition in the value of $Req_Ax$;

where x corresponds to the value of the Side A Count $CNT_A$ and y corresponds to any one of the value 1 to n.

Accordingly, for the embodiment shown in FIG. 7, the logic for each of the Side B logic units 260, 261, 262 in a 2-phase implementation can be summarized as follows:

Upon reset $CNT_B=0$ and $Req_Ay$ and $Req_By$ is low for all handshake units 230, 231, 232, 240, 241, 242;

If $Req_Bx=Ack_Bx$;

(i) commence data transfer, i.e. receive, by latching or using, the packet of data represented by data signals $DATA_{AB}x$ and store a next packet of data to be sent to the first time domain into the memory unit 328B of handshake unit 24x;

(ii) increment the value of Side B Count $CNT_B$; and (iii) generate the request control signal $Req_Bx$ by causing a transition in the value of $Req_Bx$;

where x corresponds to the value of the Side B Count $CNT_B$ and y corresponds to any one of the values 1 to n.

It is understood that these reset states summarized above and shown in FIG. 9 need not be low. The reset states simply determine which handshake unit 230, 231, 232, 240, 241, 242 will commence transmitting packets of data first and which time domain commences transferring packets of data first. If it is known at reset that a particular time domain will commence transferring data first, then it is preferred that the reset states correspond to that side.

It is apparent that in order for the bi-directional single handshake units 230, 240, 231, 241, 232, 242 to operate, the first time domain must have a packet of data to send to the second time domain for each packet of data that the second time domain has to send to the first time domain. In the event that the first time domain does not have packets of data to send to the second time domain, the first time domain will nevertheless send a request signal $Req_Ax$ to the second time domain. For example, if handshake unit 230 has received a packet of data from handshake unit 240, handshake unit 230 will send a request signal $Req_A0$ to acknowledge receipt of the packet of data from handshake unit 240. However, handshake unit 230 will not have a valid packet of data to send to handshake unit 240.

In order to avoid the second time domain using non-valid data, the bi-directional single handshake unit 230 has a first validation unit 336A which sends a validation signal $VALID_{AB}0$ to the second time domain indicating that the packet of data represented by data signals $DATA_{AB}0$ are not valid. In this way, handshake unit 240 can send valid packets of data to handshake unit 230 and receive the acknowledge signal $Ack_B0$, without handshake unit 240 and the second time domain inadvertently receiving and using non-valid packets of data from handshake unit 230 and the first time domain.

Likewise, bi-directional single handshake unit 240 has a second validation unit 336B, shown in FIG. 8, which sends a validation signal $VALID_{BA}0$ indicating to the bi-directional single handshake unit 230 and the first time domain that the packets of data being transferred by bi-directional single handshake unit 240 from the second time domain are not valid when the second time domain does not have a valid packet of data to send to the first time domain.

The validation signals $VALID_{AB}0$ and $VALID_{BA}0$ will be received by logic circuits in the first time domain and the second time domain, respectively. In the same manner, bi-directional single handshake units 231, 241, 232, 242 may also comprise validation units (not shown) to indicate that packets of data being sent are not valid.

While FIGS. 2 and 7 disclose devices 20 and 200 having three channels such that three packets of data can be transferred across the asynchronous boundary 6 at any one time, it is understood that the present invention is not limited to only three channels. Rather, the present invention encompasses devices with a plurality of channels, such as 2, 3, 4 or more channels. Preferably, if it is known that one time domain will be sending bursts of a particular size, such as cache lines of data, the devices 20, 200 will have sufficient channels to transfer packets of data corresponding to the burst size.

It is understood that the present invention can be incorporated in a chip, a core within a chip, partitioned between multiple chips, or electronic elements on a board or partitioned between multiple boards or multiple systems.

It is further understood that the present invention can be used to transfer packets of data across any asynchronous boundary 6. For example, the asynchronous boundary 6 could be located across buses within a system, or, on a board having an independent clock and a bus in a system. Without limiting the foregoing, the present invention could be used to transfer data across an asynchronous boundary 6 located between a video board and a peripheral component interface (PCI) bus. The present invention could also be used to transfer data across an asynchronous boundary 6 separating two networks, each network operating in its own time domain.

Furthermore, it is understood that in one preferred embodiment the memory units 328A, 328B have been disclosed comprising flip-flop gateways, but the memory units 328A, 328B need not comprise latches. Rather, the memory units 328A, 328B can comprise any type of memory storage devices, such as registers or Random Access Memory (RAM) or latches which can store packets of data to be sent across the asynchronous boundary 6.

Likewise, it is understood that the data signals $DATA_{AB}$ and the data signals $DATA_{BA}$ can be transferred across the asynchronous boundary 6 in any known manner. Without limiting the foregoing, the data signals $DATA_{AB}$ and $DATA_{BA}$ and the handshake signals $Req_X$ and $Ack_X$ can be transferred across the asynchronous boundary 6 using any type of buses or transmission medium, including fibre optics.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

We claim:

1. A data transfer device for transferring packets of data having a predetermined order across an asynchronous boundary separating a first time domain from a second time domain, said device comprising:

a plurality of transmitters located in the first time domain for transmitting packets of data across the asynchronous boundary, each transmitter transmitting one packet of data in response to a transmit signal;

a plurality of receivers located in the second time domain for receiving the packets of data transmitted by the plurality of transmitters, each receiver receiving packets of data from only one transmitter of the plurality of transmitters;

first ordering means located in the first time domain for sending the transmit signal to the transmitters to transmit the packets of data in the predetermined order; and second ordering means located in the second time domain for outputting the packets of data received by the receivers in the predetermined order.

2. The data transfer device as claimed in claim 1 wherein the first ordering means sends the transmit signal to the transmitters in a predetermined transmitting sequence; and wherein the second ordering means can output the packets of data received by the receivers in a predetermined receiver sequence which corresponds to the predetermined transmitting sequence.

3. The data transfer device as claimed in claim 1 wherein the first ordering means sequentially sends the transmit signal to the transmitters in a predetermined transmitter sequence commencing with a first transmitter;

wherein the second ordering means sequentially outputs packets of data received by the receivers in a predetermined receiver sequence commencing with a first receiver; and wherein the first receiver receives packets of data from the first transmitter and the predetermined receiver sequence corresponds to the predetermined transmitter sequence such that the second ordering means will output the packets of data in the predetermined order.

4. The data transfer device as claimed in claim 3 wherein the first ordering means comprises first selecting means for repeatedly selecting each one of the plurality of transmitters in the predetermined transmitter sequence commencing with the first transmitter; and wherein the first ordering means sends the transmit signal to the transmitter selected by the first selecting means.

5. The data transfer device as claimed in claim 4 wherein the second ordering means comprises second selecting means for repeatedly selecting each one of the plurality of receivers in the predetermined receiver sequence commencing with the first receiver;

wherein the second ordering means outputs packets of data from the receiver immediately previously selected by the second selecting means.

6. The data transfer device as claimed in claim 5 wherein each receiver sends an acknowledge signal to the transmitter to acknowledge receipt of a packet of data only after the receiver has received the packets of data and the second selecting means has selected the receiver; and wherein the first ordering means sends the transmit signal to the transmitter only when the first selecting means has selected the transmitter and the transmitter has received an acknowledge signal acknowledging receipt of an immediately previous packet of data.

7. The data transfer device as claimed in claim 6 wherein each transmitter requests that a packet of data be received by sending a request signal to the receiver which receives packets of data from the transmitter;

wherein each transmitter is connected to a data bus upon which the packets of data are placed in the predetermined order and the transmitters send the request signal and latch the packet of data on the data bus in response to the transmit signal; and wherein receivers can receive a packet of data only after receipt of a request signal.

8. The data transfer device as claimed in claim 7 wherein the first selecting means selects a next transmitter in the predetermined transmitter sequence each time a packet of data is latched to one of the plurality of transmitters; and wherein the second selecting means selects a next receiver in the predetermined receiver sequence each time a request signal is received by one of the plurality of receivers.

9. The data transfer device as claimed in claim 8 wherein the plurality of transmitters comprises n transmitters, where n is an integer greater than 1, and wherein the plurality of receivers comprise n receivers, each receiver associated with only one transmitter for receiving packets of data from the one associated transmitter only; and wherein the first selecting means comprises first counter means for counting a first count, the first count having a value corresponding to each one of the n transmitters commencing with the first transmitter, and the first ordering means sends the transmit signal to the transmitter which corresponds to the first count.

10. The data transfer device as claimed in claim 9 wherein the second selecting means comprises second counter means for counting a second count, the second count having a value corresponding to each one of the n receivers commencing with the first receiver, and the second ordering means comprises multiplexer means for outputting packets of data received by the receiver which corresponds to the second count less 1.

11. The data transfer device as defined in claim 1 wherein the first ordering means sequentially sends the transmit signal to each one of the plurality of transmitters to transmit the packets of data in an order which corresponds to the predetermined order and the second ordering means outputs the packets of data in the order in which the packets of data are transmitted by the transmitters.

12. A data transfer device for transferring packets of data having a predetermined order across an asynchronous boundary separating a first time domain from a second time domain, said device comprising:

a plurality of channels, each channel for sending one packet of data across the asynchronous boundary from the first time domain to the second time domain in response to a first control signal;

first ordering means located in the first time domain for sending the first control signal to the channels to transmit the packets of data in the predetermined order; and second ordering means located in the second time domain for outputting the packets of data in the predetermined order.

13. The data transfer device as defined in claim 12 wherein the first ordering means sends the first control signals to the channels in a first predetermined transmitting sequence commencing with a first channel;

wherein the second ordering means outputs the packets of data received from the channels in a first predetermined receiving sequence commencing with the first channel; and wherein the first predetermined transmitting sequence corresponds to the first predetermined receiving sequence.

14. The data transfer device as defined in claim 13 wherein each channel can send on e packet of data across the asynchronous boundary from the second time domain to the first time domain in response to a second control signal;

wherein the second ordering means sends the second control signal to the channels in a second predetermined transmitting sequence;

wherein the first ordering means outputs the packets of data received from the channels in a second predetermined receiving sequence; and wherein the second predetermined transmitting sequence corresponds to the second predetermined receiving sequence.

15. The data transfer device as defined in claim 14 wherein each channel comprises:

first memory means located in the first time domain for storing packets of data to be sent from the first time domain to the second time domain;

first control means located in the first time domain for sending a first request signal indicative of a request that the second time domain receive one packet of data stored in the first memory means;

second memory means located in the second time domain for storing packets of data to be sent from the second time domain to the first time domain;

second control means located in the second time domain for sending a second request signal indicative of a request that the first time domain receive one packet of data stored in the second memory means; and wherein receipt of the second request signal by the first control means acknowledges receipt by the second time domain of an immediately previous packet of data from the first time domain and receipt of the first request signal by the second control means acknowledges receipt by the first time domain of an immediately previous packet of data from the second time domain.

16. The data transfer device as defined in claim 15 wherein the first predetermined transmitting sequence identifies the same channel as the second predetermined receiving sequence and the second predetermined transmitting sequence identifies the same channel as the first predetermined receiving sequence.

17. The data transfer device as defined in claim 16 wherein the first ordering means sends the first control signal to a next channel in the first predetermined transmitting sequence and the second predetermined receiver sequence each time a packet of data is stored in the first memory means and the second request signal has been received in the first time domain by one of the channels; and wherein the second ordering means sends the second control signal to a next channel in the second predetermined transmitting sequence and the second predetermined receiver sequence each time a packet of data is stored in the second memory means and the first request signal has been received in the second time domain by one of the channels.

18. A method for transferring packets of data having a predetermined order across an asynchronous boundary separating a first time domain from a second time domain, said method comprising the steps of:

(a) transmitting a packet of data in the predetermined order across the asynchronous boundary from one transmitter of a plurality of transmitters located in the first time domain to an associated receiver of a plurality of receivers located in the second time domain, wherein each receiver is associated with one transmitter such that the receiver can receive packets of data from only the transmitter with which the receiver is associated;

(b) outputting the first packet of data in the second time domain in the predetermined order;

(c) transmitting a next packet of data in the predetermined order across the asynchronous boundary from one of the transmitters to the associated receiver;

(d) outputting the next packets of data in the second time domain in the predetermined order; and (e) repeating steps (c) and (d) for each packet of data to be transferred to the second time domain.

19. The method as claimed in claim 18 wherein step (c) further comprises the step of:

(i) selecting one transmitter of the plurality of transmitters to transmit the next packet of data according to a predetermined transmitting sequence; and wherein step (d) further comprises the step of:

(ii) outputting the next packet of data from one receiver of the plurality of receivers selected according to a predetermined receiver sequence;

wherein the predetermined transmitter sequence commences with a first transmitter and the predetermined receiver sequence commences with a first receiver, said first receiver being associated with the first transmitter; and wherein the predetermined receiver sequence corresponds to the predetermined transmitter sequence such that the second ordering means will output the packets of data in the predetermined order.

* * * * *